Figure 1:
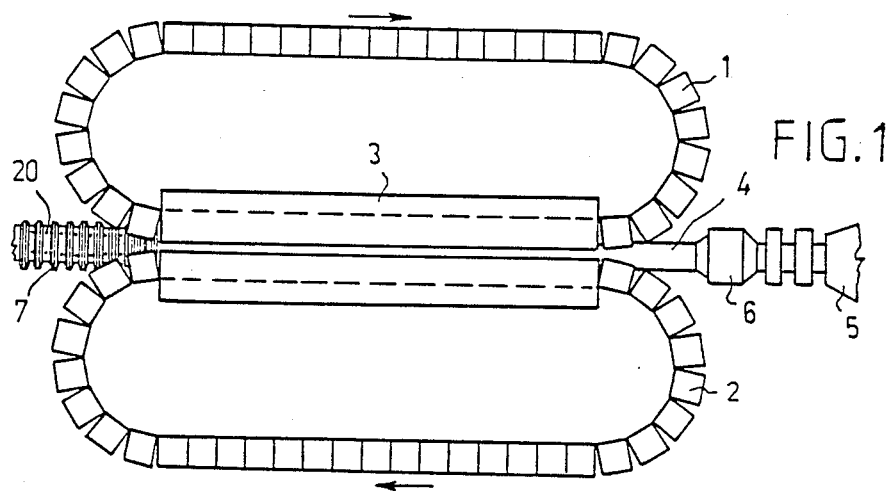

ic pipe.
United States Patent [19]
Järvenkylä

[11] Patent Number: 4,873,048
[45] Date of Patent: Oct. 10, 1989

[54] METHOD FOR THE FORMATION OF A HOLE IN A PLASTIC PIPE

[75] Inventor: Jyri Järvenkylä, Salpakangas, Finland

[73] Assignee: Oy Uponor AB, Nastola, Finland

[21] Appl. No.: 217,083

[22] Filed: Jul. 7, 1988

Related U.S. Application Data

[63] Continuation of Ser. No. 889,325, Jul. 23, 1986, abandoned.

[30] Foreign Application Priority Data

Jul. 24, 1985 [FI] Finland ................................ 852886

[51] Int. Cl.$^4$ ...................... B29C 49/04; B29C 49/38
[52] U.S. Cl. .................... 264/504; 264/508;
264/521; 264/526; 264/571; 425/290; 425/303;
425/326.1; 425/336; 425/342.1; 425/387.1;
425/388; 425/396; 425/DIG. 119
[58] Field of Search .............. 264/504, 505, 506, 508,
264/521, 540, 571, 573, 565, 566, 526;
425/326.1, 525, 532, 396, 387.1, 388, 336, 342.1,
303, DIG. 119, 290

[56] References Cited

U.S. PATENT DOCUMENTS

| | | | |
|---|---|---|---|
| 3,349,156 | 10/1967 | Zieg | 264/508 |
| 3,708,253 | 4/1974 | Lemelson | 425/326.1 |
| 3,947,174 | 3/1976 | Hureau et al. | 264/560 |
| 4,303,609 | 12/1981 | Hureau et al. | 264/504 |
| 4,541,794 | 9/1985 | Raley et al. | 264/504 |
| 4,655,986 | 4/1987 | Cothran et al. | 264/508 |

Primary Examiner—Jan H. Silbaugh
Assistant Examiner—Neil M. McCarthy
Attorney, Agent, or Firm—Ladas & Parry

[57] ABSTRACT

A method of forming a hole in a plastic pipe feeds a plastic layer for the plastic pipe from a nozzle about a mandrel into chill moulds being displaced along an elongated mould cavity about the mandrel formed by the chill moulds. All of the plastic layer is pressed into the chill moulds with a pressure medium between the mandrel and all of an inner surface of the plastic layer for forming the plastic pipe therefrom. Only portions of the plastic layer of the plastic pipe are then subjected to a local pressure difference exceeding the breaking limit of the plastic layer between the inner surface and an opposite, outer surface of the plastic layer at least in part from a flowing medium for forming a hole in the plastic layer of the plastic pipe, the flowing medium being one of a gas and a liquid and flowing from the mandrel at a pressure higher than that of the pressure medium pressing the plastic layer of the plastic pipe.

5 Claims, 1 Drawing Sheet

U.S. Patent

Oct. 10, 1989

4,873,048

METHOD FOR THE FORMATION OF A HOLE IN A PLASTIC PIPE

This is a continuation of copending application Ser. No. 899,325 filed on July 23, 1986, now abandoned.

This invention relates to a method of forming a hole in the wall of a plastic pipe being manufactured by chill moulds being displaced along forming an elongated mould cavity formed thereby, a mandrel positioned in the mould cavity, and a nozzle between the chill moulds and the mandrel for feeding a plastic material, the plastic material being pressed against the inner surface of the chill moulds by a pressure medium. The invention also to a device for so forming a hole in a plastic pipe.

Plastic pipes having holes in the walls thereof are widely used as drainage pipes. In most cases the pipes are corrugated, whereby the walls thereof are provided with ring-shaped corrugations the bottoms of which are provided with round holes or slots extending in the direction of the corrugation. However, smooth pipes provided with holes are also used as drainage pipes.

The holes of drainage pipes are nowadays formed in finished rigid pipes by mechanical means. In one known method inwardly-directed protuberances are formed in the troughs of corrugations of the pipe and cut off after the pipe has been so formed by a knife positioned within the pipe, as a result of which a hole is formed at the point where the protuberances were positioned. Finnish Patent Application 780 609 discloses another known method in which a helical cutting device is positioned outside of a finished pipe and which to make cuts in the wall of the pipe.

In these known methods, a finished pipe is provided with holes in an extra working step, wherefore the methods are expensive. Additionally, the devices for forming holes are unreliable in operation and the synchronization thereof with the corrugations of the pipe is difficult. Further, they must be frequently sharpened and their size must be adjusted to the size of the pipe.

The object of the present invention is to provide a method for the formation of holes, by means of which method holes can be formed in a pipe in a simpler manner than previously. The method according to the invention is characterized in that a local pressure difference exceeding a nozzle-fed, pipe forming breaking limit of the plastic layer is created between opposite, inner and outer surfaces of only portions of the plastic layer by a flowing medium.

The local pressure difference between the inner and outer faces of a plastic pipe while it is still in a plastic-layer or plasticized state forms a hole in the pipe wall, whereby a holed pipe can be manufactured in a single step without any subsequent mechanical treatment. The manufacturing time of the pipe is also decreased. The manufacturing process also can be fully automated, which reduces the need of human labour as compared with known methods.

A gas or a liquid is preferably used as the flowing medium. It is preferably at a high temperature because a high temperature is of advantage for the formation of the holes.

Since it is fairly difficult to feed the following, e.g. pressurized medium into chill moulds, which are about the plastic layer as it is formed into the pipe it is of advantage to subject the plastic layer to a higher pressure flowing medium from the direction of a mandrel then inside the chill moulds and plastic layer. The pressure of the hole-forming flowing medium from the mandrel preferably exceeds the pressure of another, pressurized medium thereabout which presses all of the plastic layer against the inner face of the chill moulds. This is of advantage in that if the inner face of the plastic pipe is not pressed tightly against the edges of the opening of the mandrel and if the pressurized medium as a result thereof leaks e.g. into the medium space positioned between the mandrel and the inner face of the plastic pipe, the plastic pipe being pressed against the inner face of the chilled moulds by means of the medium contained in said space, this leakage of the medium does not cause any problems, because the medium can be discharged through the nozzle of said moulding medium by virtue of the high pressure thereof.

If the device for the manufacture of pipes comprises a cooling zone, the plastic layer is preferably exposed to the pressure difference before it reaches the cooling zone of the mandrel.

The invention is also concerned with a device for the formation of a hole in a plastic pipe, said device comprising chill moulds forming an elongated mould cavity and being displaceable in the longitudinal direction of the central shaft of the mould cavity; a mandrel positioned in the mould cavity; a nozzle provided between the chill moulds and the mandrel for feeding a plasticized plastic material; and a nozzle for feeding a pressure medium on the inside of a plastic pipe still in the plasticized state in order to press the pipe against the inner surface of the chill moulds.

The device according to the invention is characterized in that an opening is provided in the jacket surface of the mandrel and the inner surface of the chill moulds, that said openings communicate with sources for mediums having different pressures in order to create a pressure difference between the openings, and that the openings are so positioned that they are intermittently in alignment as a result of the relative movement of the chill moulds and the mandrel.

By means of the device according to the invention it is possible to create medium pressures differing from each other at a determined point on the inside and outside of the wall of the plastic pipe, by means of which pressures a hole can be made in the wall.

In its simplest form, the device is so constructed that the opening of the mandrel communicates with a source of a pressurized medium, and the opening of the chill moulds communicates with the atmosphere or an underpressure source.

When the hole is made by means of a pressure impact created in the opening of the mandrel, a valve has to be provided in the mandrel in a channel between the opening of the mandrel and the medium source.

In a device in which the outer surface of the chill moulds is pressed against a guide rail, the opening of the chill moulds can be closed and opened relative to the atmosphere simply by providing the rail with mutually spaced holes through which the opening of the chill moulds intermittently communicates with the atmosphere when the moulds are moving along the guide rail.

In order that the medium having the higher pressure would be passed through the pipe wall into the opening positioned on the opposite side of the wall, it is essential that the distance between the edges of the openings of the mandrel and the chill moulds corresponds to the wall thickness of the plastic pipe, because the pipe wall thereby forms a sealing which is pressed both against the wall of the moulds and against the wall of the mandrel.

If the inner surface of the chill moulds is provided with ring-shaped ribs having an end face extending in parallel with the direction of motion of the moulds, the width of the end face should preferably exceed the wall thickness of the plastic pipe. This ensures that a sufficient sealing is provided around the openings.

According to one preferred embodiment of the device according to the invention, the area of the opening of the chill moulds is such that the pipe wall forms a protrusion at the opening when the plastic pipe is pressed against the inner surface of the chill moulds. The protrusion makes it easier to form a hole in the wall through the openings.

If required, the pipe can be cut off by means of the pressure medium if the mandrel and the inner face of at least one chill mould is provided with slot-like openings extending in the direction of the periphery and having the same length as the periphery.

Figure 2:
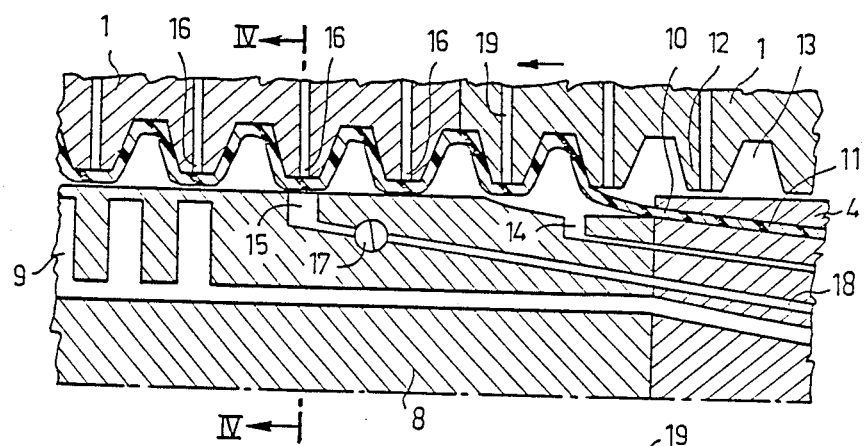
Figure 3:
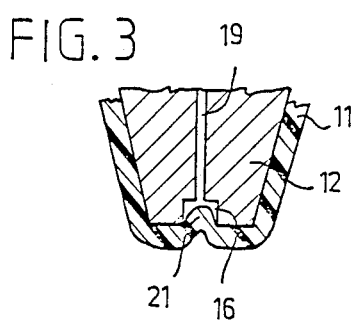
Figure 4:
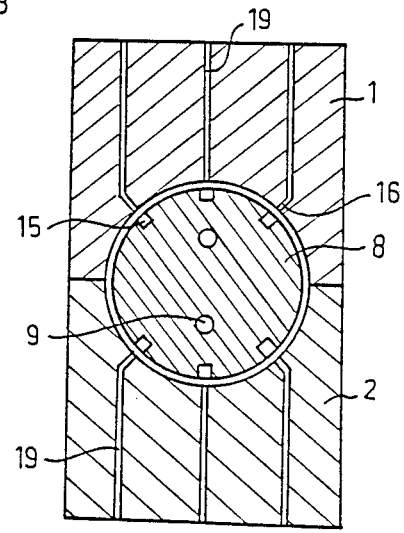

The invention will be described more closely below with reference to the attached drawing, wherein FIG. 1 is a general view of a device for the manufacture of a corrugated pipe, FIG. 2 is an enlarged longitudinal section of one detail of the device, FIG. 3 illustrates another embodiment of a rib of a chill mould, and FIG. 4 is a sectional view along the line IV-IV of FIG. 2 in such a manner that the upper and lower chill mould are visible.

The device shown is FIG. 1 comprises chill moulds 1 and 2 moving around along two endless paths and meeting each other within the area of guide rails 3 to form a cylindrical mould cavity. An extrusion sleeve 4 connected to an extrusion head 6 of an extruder 5 extends into said cavity. It further appears from FIG. 1 how a finished pipe 7 protrudes from the other end of the cavity formed by the chill moulds.

FIG. 2 is more detailed view of those parts of the device which take part in the moulding of the pipe. A mandrel 8 is positioned on the central line of the device, the terminal end of the mandrel being provided with hollows 9 for a cooling agent. The extrusion sleeve 4 and the mandrel 8 define therebetween a ring nozzle 10 wherefrom a plasticized plastic material 11 is fed into a space defined between the chill moulds and the mandrel. For the corrugation of the pipe the inner surface of the chill moulds is provided with ring-shaped ribs 12 and grooves 13, the plastic material 11 being pressed against said ribs and grooves by means of a pressure medium, such as e.g. air, which is fed into the space between the plastic material and the mandrel through a nozzle 14.

According to the invention the surface of the jacket of the mandrel 8 is provided with openings 15 after the nozzle 14, and the inner surface of the chill moulds is provided with openings 16 on the crests of the ribs 12. In the embodiment of FIG. 2, the openings 15 of the mandrel communicate with a tank (not shown) for the pressurized medium through channels 18 provided with magnetic valves 17, whereas the openings 16 communicate with the atmosphere through a channel 19.

The mandrel openings 15 are e.g. six in number, and they are distributed over the surface of the jacket of the mandrel e.g. in a manner shown in FIG. 4. The openings 16 of the chill moulds, in turn, are so positioned that there are e.g. three such openings in every rib of each mould so that there are in each particular case six openings 16 provided in a rib extending from one mould to another, see FIG. 4. The openings 15 and 16 are positioned in alignment with each other in the longitudinal direction of the device.

The device according to the invention operates in the following way. Simultaneously as the chill moulds 1, 2 move from the right to the left in FIGS. 1 and 2, the nozzle 10 feeds a plastic material 11 in a plasticized state into a space defined between the moulds and the mandrel, in which space the plastic material is pressed against the inner surface of the moulds by the action of the pressure medium applied through the nozzle 14, whereby the pipe is provided with corrugations. Pressurized, preferably heated air is fed through the channel 18 into the openings 15 of the mandrel. The feeding can be effected continuously or intermittently by means of the magnetic valve 17.

The pressure, which possibly prevails constantly in the opening 15, affects the plastic material 11 only when the mid points of the ribs 12 of the chill moulds, and the openings 16 positioned at these points, are brought into alignment with the openings 15 of the mandrel. At this moment the air pressure in the openings 15 exceeds the breaking limit of the plastic layer, being released through the pipe wall into the openings 16 and further into the atmosphere through the channels 19. Since the distance between the ribs 12 of the chill moulds and the jacket i.e. outermost surface of the mandrel 8 corresponds to the thickness of the plastic layer, the layer seals the edges of the opening 15 in such a manner that no pressure air gets within the area of the adjacent grooves 13 of the chill mould. If any pressure air should get within the area of the grooves 13, this air can be discharged at least partly through the nozzle 14, provided that the pressure of the air from the opening 15 exceeds considerably the pressure of the air fed through the nozzle 14. Holes formed in the bottoms of the corrugations of the pipe 7 are designated by the reference numeral 20 in FIG. 1.

If desired, the communication of the openings 16 of the chill moulds with the atmosphere can be interrupted for the period of time when the openings 16 are not in alingment with the openings 15 of the mandrel by positioning the outlets of the openings 16 on the outer surface of the chill moulds within the area of the guide rails 3 and by providing the guide rails with mutually spaced holes. These holes are so positioned that when the openings 15 and 16 are in alignment, the outlets of the openings 16 of the chill moulds are in alignment with the holes of the guide rails. FIG. 3 illustrates another embodiment of the rib of the chill moulds. In this case the opening 16 is so large that the wall of the plastic pipe thrusts into the opening by the action of the air applied through the nozzle 14 and foms a protrusion such as shown in FIG. 3. The pressure of the air applied through the nozzle 14 must not, however, be so high that a hole is formed in the pipe wall, because this would cause a drop in the air pressure. The protrusion 21 makes it easier to form a hole in the pipe wall when the openings 15 and 16 are in alignment.

The end face of the ribs 12, i.e. the crest face thereof, which extends in parallel with the direction of motion of the chill moulds, is preferably substantially broader than the wall thickness of the plastic pipe.

The invention has been described above with reference to a device by means of which corrugated, one-walled pipes are manufactured. The method is correspondingly suited for use in the manufacture on doublewalled corrugated pipes referred to in Finnish Patent Specification No. 60 990. In place of the overpressure of the openings 15, the required pressure difference can be achieved by connecting the channels 19 of the chill moulds to an underpressure source. Additionally, it is possible to apply pressure air through the openings 16 of the chill moulds, whereby the air is discharged into the openings 15 of the mandrel. Thereby it would be advisable to make the mandrel hollow so that it can receive the plastic pieces possibly detached in connection with the formation of the hole.

In the embodiments of the figures the openings 15, 16 are round in cross-section; however, it is obvious that they can be of some other shape as well, e.g. elongated in the peripheral direction of the ribs. According to a further preferred embodiment, the openings are slot-like and extend over the entire length of the periphery of the chill moulds and the mandrel. This kind of openings can be provided in the mandrel and in at least one chill mould in addition to the openings described above, and they can be used for cutting off the pipe e.g. by means of a pressure liquid having a pressure of 10 to 100 bar. Said slot is preferably about 0,1 mm in width.

The cooling zone 9 of the mandrel, which zone is positioned after the openings 15, 16, can be left out, if desired, whereas it is possible to heat the initial portion of the mandrel. The distance of the openings 15 from the nozzle 10 in a conventional extruder is 10 to 500 mm, and the pressure prevailing in the openings is 2 to 40 bar.

What is claimed is:

1. A method of forming a hole in a corrugated plastic pipe, comprising the steps of:
   providing a mandrel;
   feeding a plastic layer for forming said corrugated plastic pipe from a nozzle located at one end of the mandrel into an elongated mould cavity between an outermost surface of the mandrel and inner surfaces of chill molds which are displaced along the mandrel and which define a corrugated pattern; pressing all of the plastic layer into the chill mould with a pressure medium between the outermost surface of the mandrel and an inner surface of the plastic layer, thereby forming corrugations in said plastic layer, said corrugations having adjacent regions of crests and troughs; displacing the corrugated plastic layer with the chill moulds along the mandrel to an opening in the outermost surface of the mandrel; covering said opening in said mandrel and sealing around the edges of the opening in said mandrel with the plastic layer forming one of said troughs, said sealing arising from having the distance between the corresponding trough forming portion of said chill mound and the outermost surface of said mandrel surrounding said opening correspond to the thickness of the portion of the plastic layer forming said one of said troughs, said sealing being effective to prevent pressure from a pressure medium emanating from said opening from reaching areas of the plastic layer adjacent said one of said troughs; and, then subjecting only the portion of the plastic layer covering said opening in the mandrel to a local pressure difference exceeding a breaking limit of the plastic layer, said pressure difference being applied between the inner surface and opposite outer surface of the plastic layer at the location of said one of said troughs, said pressure difference at least in part arising from a pressure medium emanating from the opening in the mandrel, said pressure difference forming a hole through the plastic layer at the location of said one of said troughs thereby allowing said pressure medium to be released through said hole formed in said plastic layer and then through an opening in said trough forming portion of said chill mould, said pressure medium being selected from the group consisting of gas and liquid.

2. A method according to claim 1, wherein said pressure difference forming said hole is 2 to 40 bar.

3. A method according to claim 1, wherein the flowing medium is at a high temperature.

4. A method according to claim 1, wherein the local pressure difference is achieved in part by an underpressure applied to the surface of the plastic layer which entails said trough forming portion of said chill mould.

5. A method according to claim 1, wherein the mandrel has a cooling zone and the plastic layer is subjected to the local pressure difference before the plastic layer reaches the cooling zone of the mandrel as the chill moulds displace along the elongated mould cavity about the mandrel.

* * * * *